March 23, 1943.  O. J. L. SEAMAN  2,314,663
METHOD OF PRODUCING COMPOSITE PHOTOGRAPHS
Original Filed Dec. 23, 1937
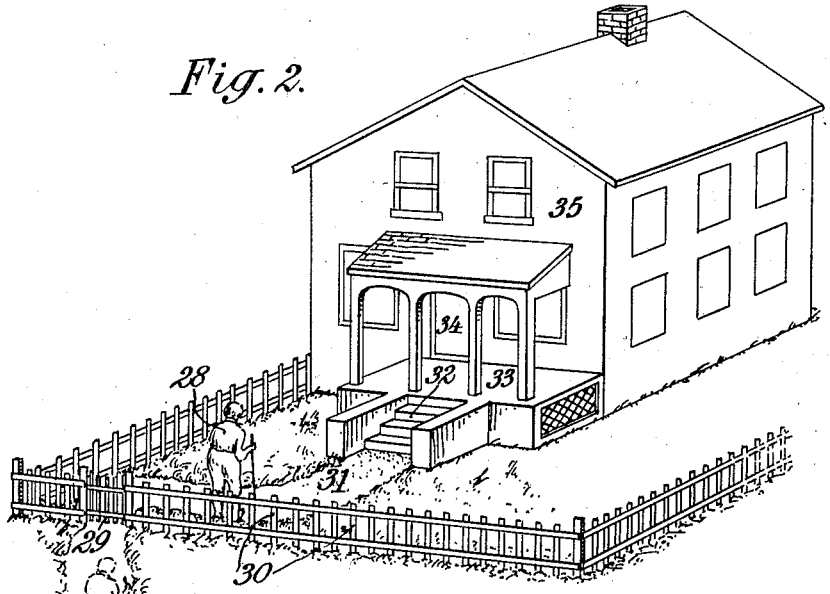
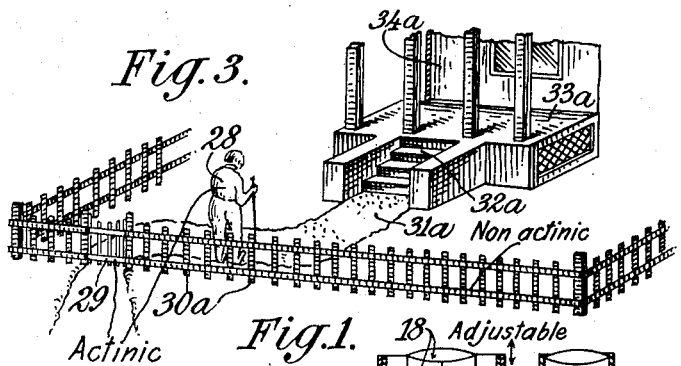
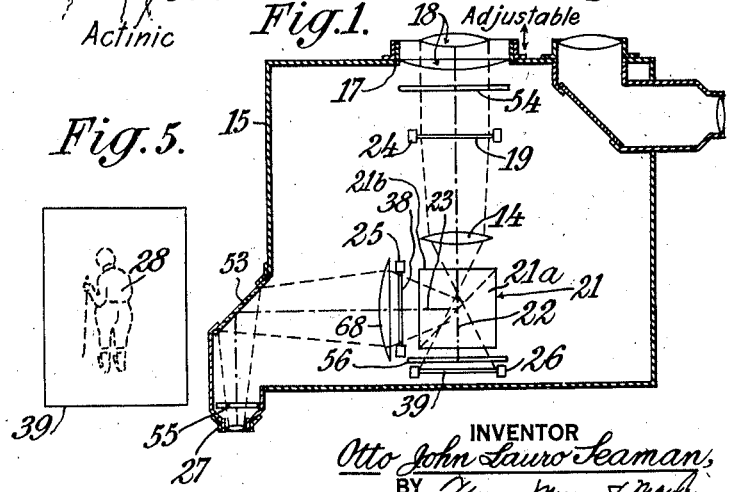
INVENTOR
Otto John Lauro Seaman,
BY
ATTORNEYS.

Patented Mar. 23, 1943

2,314,663

UNITED STATES PATENT OFFICE 2,314,663

METHOD OF PRODUCING COMPOSITE PHOTOGRAPHS

Otto John Lauro Seaman, Encino, Calif.

Original application December 23, 1937, Serial No. 181,251. Divided and this application December 17, 1940, Serial No. 370,437

5 Claims. (Cl. 88—16)

This application is a division of my prior application, Serial No. 181,251, filed December 23, 1937, patented January 28, 1941, under Patent No. 2,229,678.

This invention relates to a method for composing in a single photograph, parts of two or more scenes which may have been separately photographed at different times and places, and in its more particular aspects, to improvements in the so-called "masking" process of photographic composition.

The principal object of the invention is to provide a process for the composition in a single photograph of two scenes, one photographed at one time and place and the other at some earlier time and perhaps remote location, with such accurate registration between the different parts and such proper proportion between them as to create a realistic illusion that the result is a photograph of a single scene.

It is a more specific object of the invention to provide a "masking" process of photographic composition which includes a step allowing of visual comparison of an image of one scene with an image of the scene with which it is to be combined. This comparison brings out errors of registration and proportion which could not practically be caught in any other way, and permits of their correction before the separate scenes are photographically combined. It accordingly makes possible the production of composites without wasting film and effort in "retakes," a practice which has characterized prior methods of composition and made them both expensive and unsatisfactory. Of perhaps greater importance is the fact that the new method greatly extends the field of application of composite photography. It no longer need be confined to the combining of simple scenes in which all of the action appears to take place in front of the background. On the contrary, and by reason of the precise registration obtainable with it, the method may be employed in the composing of complex scenes wherein a portion of the separately photographed action seems to occur in front of objects of the background, and other parts have the appearance of taking place behind those or other background objects, and in fact in the composition of almost any kind of scene from separately photographed components.

The full nature of the invention along with other objects and various features thereof will be more fully understood from the following description when read in connection with the accompanying drawing, in which:

Fig. 1 is an optical diagram of a camera which may be employed to advantage in practicing the method of the present invention.

Fig. 2 is a perspective view of a scene which is to be photographically composed from separately photographed action and background scenes by the use of the invention.

Fig. 3 is a perspective view of a non-actinic set before which the action portions of the composite of Fig. 2 are to be taken, and Figs. 4 and 5 illustrate a pair of films employed in the process at one stage of that process.

The new process may be briefly described as comprising the steps of making identical images of a foreground or action scene upon a pair of films before a non-actinic set whereby only the action will be recorded upon the films, leaving their remaining portions photographically unaffected; the development of one of these films to such an extent that the images which it bears are rendered substantially opaque, the remaining film being left just as it is for the time being; the placing of the developed film in the plane of an image of the desired background scene; the visual comparison of the action image upon the developed film with the image of the background whereby any disproportion or lack of registration between them may be corrected; and finally the exposing of the as yet undeveloped one of the two films to that background scene through a path which is the optical equal of that through which the comparison was made, the developed film serving to mask the latent action or foreground images on the undeveloped film during this second exposure. When the doubly exposed film is then developed, it will be found to bear a composite of both the foreground and the background scenes, and the proportion and registration of the two will be precisely that established during the visual comparison of the mask with the background image.

A process of this kind is equally applicable to the composition of either still or motion pictures. Since its greatest utility will perhaps be found in the motion picture industry, the invention will be hereinafter more particularly described with reference to the making of movies.

In practicing the method it will be found desirable to employ a camera of the type illustrated diagrammatically in Fig. 1 and comprising a casing 15 having a primary lens aperture 17 provided with a lens system 18 of such character as to be capable of creating an aerial image at the primary focal plane 19; a copying lens 14; a light splitting device capable of dividing light passing through the primary focal plane 19 and of directing it along two substantially identical optical paths 22 and 23; a film gate 24 located at the primary focal plane 19, and a pair of film gates 25 and 26 located in the light paths 23 and 22 respectively, at equal distances from the optical center of the light splitter and at secondary image focal planes, these distances being such that images cast upon films carried in the gates 25 and 26 will be substantially identical with each other and with the image cast upon a film in gate 24; and a viewing aperture located in the optical path 23 at some point beyond the film gate 25, and provided with an eye-piece 27. The details of this camera are set forth at greater length in the identified co-pending parent application, and reference may be had to that application for a better understanding of the device.

With that camera, a pair of films in the gates 25 and 26 may be exposed simultaneously to an action scene which is presented before a non-actinic set for the purpose of producing the two substantially identical photographic images of the action referred to in the foregoing brief description. The next step of the process involves the removal of a film from gate 25, which may be done without disturbing the exposed film in gate 26, and its development to such an extent that the action image on it is rendered substantially opaque. The developed film is then replaced in the camera, this time in gate 24 at the primary focal plane 19, in accordance with the third step of the process. The exposure of the foreground having been completed, the camera may be set in position before a background scene, and the eye-piece 27 and the light path 23 may be used to examine an image of the background through the developed film in gate 24. If the foreground and background objects in the resulting composite image are in any way disproportionate, that may readily be corrected by a manipulation of the primary lens system 18, or by a shifting of the position of the camera. Once any desired proportion has been obtained, the film in gate 26 may be exposed to the image of the background through the developed film (with the opaque image on the latter masking the latent image on the former) and upon removal from the camera, and development, it will be found to bear a composite image of the objects of both the foreground and background scenes.

The advantages of the new process may be comprehended more fully by a consideration of a practical composition problem. For this purpose it will be assumed that the scene of Fig. 2 represents the desired final result, and that in producing it the movements of the actor 28 were photographed at one time, and were then superimposed upon a desired background scene in such fashion that the actor appears to open and pass through the gate 29 to walk behind the fence 30, up the path 31, to mount the steps 32 and walk across the porch 33 behind the various posts and other obstacles, and to enter the doorway 34 and disappear into the house 35. The problem then involves not the simple one of merely inserting one scene entirely in front of another, but the much more complex situation wherein an actor first passes in front of the background, then behind parts of it, and finally appears to enter and disappear behind certain objects of the latter scene.

In composing such a scene the action or foreground objects are photographed against a non-actinic set so that the film used in making these exposures will be affected only by light reflected from the object—not by any light reflected by the set itself. If, as in the assumed problem, the actor will at any time pass behind objects of the actual background, then these objects or the portions of them which obscure the figure of the actor should be present in the non-actinic set, or in the camera in film gate 24 in the form of a mask, for although they will reflect no light and hence will not effect a photographic exposure, they will cut off light reflected from the actor whenever they intervene between him and the camera. Further, those objects of the background which are to be moved by the actor must be treated as a part of the action scene—not as background material. In the illustrated case, the gate 29 in the fence 30 is such an object. It will, accordingly, be photographed against the non-actinic background along with the movements of the actor during the action exposure. Correspondingly, the gate will be omitted from the background when the scene is added to the previously exposed action one.

In preparing for the photographing of the action scene it is necessary, therefore, first to build an appropriate non-actinic set such as that shown in Fig. 3. This work, of course, must be done with the greatest of care so that the fence 30a, the porch columns, and the other background objects, will correspond exactly in size, proportion and location to the like parts of the actual background if the figure of the actor is to be in normal proportion to them. If, however, the figure of an actor is to be of abnormal proportion, the size, proportion and location of these objects must all vary in exact inverse ratio to the increase or decrease in the actor's size. For example, if the figure is to appear larger, the objects must be made smaller, and vice versa. Precision is essential in this work for any inaccuracy of execution will certainly be reflected in the final composite picture; and it is with this precision that the present invention is primarily concerned. While the construction may be based on calculation in the manner now prevalent, better results can be obtained by using a "comparative" method comprising a part of the present invention. That method, as its name suggests, involves a comparison of the proposed set and the objects which it contains with the background scene—or rather with a photograph of that scene. As a prerequisite to the construction of the set then, it is necessary to secure such a photograph. In accordance with the preferred method that is done by placing a camera of the type shown in Fig. 1 before the actual background, or before a painting, photograph or model of it, and carefully adjusting the camera, and its lenses, until a desired view is obtained. After noting the position of the camera, and its lens system setting, a film is exposed, and upon development the resulting photograph of the background scene is placed in the camera in film gate 24.

With these preliminary steps completed, the camera is placed before the proposed set in a position corresponding to the one from which the photograph was made; and an actor, or his measurements, is viewed on the proposed set through light path 23 against the photograph of the background. If the image of the actor does not appear in desired proportion to the background objects, and that desired proportion may be either natural or unnatural, then the camera may be moved towards or away from the proposed set, or the lens setting may be changed, until a proper relation is secured. Then, with the camera and its lenses held in the adjusted position, the construction of the set may constantly be checked against the photograph so that the size and shape of its contained objects may conform exactly to the like parts of the background as viewed through the photograph. In this way the background effect may be exactly duplicated in the non-actinic set with a minimum of effort—by comparison rather than by calculation. During this comparison the set must, of course, be actinically illuminated. That, however, constitutes no real obstacle for the comparison can either be made before the set is treated with a substance which will not reflect light to which the photographic emulsion is sensitive—or it may be viewed in one light which the objects will reflect, and then be photographed (at a later time) in a light which they do not reflect to the camera.

After the preparation of the set in the manner above described, the photograph of the background is withdrawn from film gate 24, the shutter 55 for the eye-piece 27 is closed, and new strips of film 38 and 39 are placed in the film gates 25 and 26 respectively, of the camera which is assumed to be properly located in front of the non-actinic set. The actor is then directed through his movements and passes through the gate in the fence and up the path, mounts the steps, etc. In so doing the films 38 and 39 are simultaneously exposed to whatever light is reflected from his person, the gate 29 and other actinically illuminated objects and not interrupted by the intervening non-actinic background objects. Specifically, as he enters the gate 29, all of the light reflected from his body and the gate will affect the two films in question, but as he passes through and behind the non-actinic fence, the palings thereof will cut off the light from parts of his body, and thus leave corresponding parts of the film entirely unaffected.

When the action has been completed, the shutters 54 and 56, respectively, are closed, and the film 39 is rewound without removing it from the camera. The other film 38 is withdrawn and developed to such extent that the image thereon becomes completely opaque, that is to say, nothing more than a mere silhouette of the actor against a clear background. This may be achieved in one of several ways, to wit, the film 38 may have been photographically faster than that indicated at 39, the light splitting device 21 may have been designed to pass more light through the path 23 than through path 22, a color separation process may be used, or it may be achieved by a simple chemical treatment, such as intensification, of the film in question. Any shrinkage or swelling in the film due to the development process or chemical treatment which causes a difference in size between films 38 and 39 must be corrected at this stage by a treatment of either or both films. In any event, as has been said, the parts of the film which were exposed become substantially opaque, and the unexposed parts are perfectly clear.

One particular frame of this developed film will then appear substantially as shown in Fig. 4. There it may be noted that the actor at the time of exposure was passing behind the fence, and accordingly those parts of his legs which would be visible to an observer through the palings of the fence appear on the film, whereas those parts which were shadowed, so to speak, by the palings, are perfectly clear. A corresponding frame of the undeveloped film 39 would then bear an identical latent image, except in so far as the actor appears to be reversed, right for left, as shown in Fig. 5.

So much for the preparation of the action parts of the picture. The next step involves the insertion or superpositioning of these action scenes in their proper places against the desired background. This is one of the most important steps in the entire method. Accuracy of location is an essential point in the production of a satisfactory composite picture and it may be attained or lost here. In this step the camera of Fig. 1, still containing undeveloped film 39, is set up in front of the actual background scene in exactly the same position and with precisely the same lens setting that was used when taking the photograph of that scene for comparison purposes. It has been found advisable to have these factors noted on a slate which is photographed on the strip of film which contains the photograph used for comparison purposes. As a further check on position it is also advisable to recheck these factors by replacing the comparison film in film gate 24 and examining the background scene through its own photograph. This photograph is then removed and the developed masking film 38 is then inserted in the film gate 24, with the frame in film gate 24 corresponding with the frame in film gate 26, and by viewing it through the eye-piece 27 and light path 23 against the aerial image of the background, the observer can get an actual view of the composite scene which he is trying to produce, i. e., he can see a real image of the background with silhouettes of the foreground action inserted therein. If, when he views the composite image, the background objects appear too large with respect to the foreground ones, so that the palings of the fence, for example, do not register exactly with the clear space on the actor's legs, then by adjustment of the position of the camera, or a manipulation of the primary lens system 13, he can reduce the size of the background objects, as they appear in the image, until proper registry is obtained.

In making any of these adjustments, however, it is to be noted that the relative positions of the primary focal plane of the camera, and of the masking film which is held therein by the film gate 24, are in no way changed with respect to the position of the undeveloped film 39 in the gate 26. The masking film is still in exactly the same position as was the aerial image to which this film, and the film 39, were originally exposed. Accordingly, any light passing through the masking film must cast a shadow on the film 39 of such proportions as exactly to mask the latent image which it bears.

If the shutter 55 for the eye piece 27 be now closed, and that (56) for the film gate 26 opened, the film 39 will be exposed to the image of the background through the masking film, and only those parts surrounding the latent image will be photo chemically affected. Hence, when it is removed from the camera and developed, it will be found to bear a composite picture which includes both the foreground and the background objects; and will look, according to the assumed conditions, like the scene shown in Fig. 2.

In practicing the process in the manner above described, only two films, 38 and 39, are essential, although a third one may conveniently be used to assist in the solving of location and proportion problems incident to the preparation of the non-actinic set. At most, then, only three exposures need be made, and only three developments and printings had. More important than that, however, is the fact that accurate results can be obtained even with composition problems of a very complex nature. This, it is believed, flows from the fact that the various images incident to the process may be viewed through the actual light paths which are used to effect the photographic exposures; and from the fact that the actual objects and photographic images are subject to repeated comparison and correction.

While the method of composing a single picture from separately photographed scenes, as well as that of preparing a non-actinic set, has been described with reference to a particular kind of camera, it is to be understood that the invention is not limited to the use of that camera and may be practised with any appropriate apparatus. The foregoing then is intended to be construed in a descriptive rather than in a limiting sense.

What I claim is:

1. The process of producing a composite photograph by inserting an action scene into a separately photographed background scene which comprises the steps of simultaneously exposing a pair of films to an action scene presented with relation to a non-actinic background, developing one of said films without developing the other, placing the developed film in the plane of an image of the desired background scene, dividing the light passing through the background image and the developed film into two paths, using one of such paths for viewing the developed action image with relation to the background image so that the relative proportions therebetween may be adjusted, and then using the other of the paths for exposing the undeveloped film to the background scene so that the image of the action scene on the said developed film will exactly mask the latent image on the undeveloped film.

2. The process of producing a composite photograph from separately photographed action and background scenes wherein part of the action in the composite appears to occur before and other parts behind the objects of the background which comprises the steps of simultaneously exposing a pair of films to an action scene presented before a non-actinic background including non-actinic replicas of those parts of the background scene which will be wholly or partly in front of the action and actinic replicas of those parts of the background constituting any part of the action, developing one of said films so that its image becomes substantially opaque without developing the other, placing the developed action film in the plane of an aerial image of the desired background scene, dividing the light passing through the background image and the developed action film into two paths, using one of such paths for viewing the developed action image against the aerial background image so that the background objects may be brought into exact registry with appropriate blanks on the action film, and then using the other of the light paths for exposing the undeveloped action film to the aerial image of the background thorugh the developed action film, so that the developed image on the latter will exactly mask the latent image on the undeveloped action film.

3. The process of producing a composite photograph which comprises the steps of simultaneously exposing a pair of films to an action scene presented before a non-actinic background, including non-actinic replicas of those parts of the background scene which will be wholly or partly in front of the action and actinic replicas of those parts of the background scene constituting any part of the action, developing one of said films so that its image becomes substantially opaque without developing the other, placing the developed action film in the plane of an image of the desired background scene whereby to partially mask the latter image, viewing the said masked image of the background scene so that the background objects may be brought into exact registry with appropriate blanks on the action film while protecting the said undeveloped film against exposure, then exposing the said undeveloped film to the masked registered image of the background scene at such optical position that the latent image formed by the latter exposure on the said undeveloped film will register exactly with the latent image formed by the first-mentioned exposure thereof.

4. The process of producing a composite photograph which comprises the steps of preparing a set corresponding to portions of the actual background scene and including non-actinic replicas of these parts of the background scene which will appear wholly or partly in front of the action, simultaneously exposing a pair of films to an action scene presented upon said set so that portions of actors or objects in the action scene will be masked out by the said non-actinic replicas in the formation of the action images upon said films, developing one of said films without developing the other, and using the said developed film as a mask in exposing the said undeveloped film to an image of the background scene.

5. The process of producing a composite photograph which comprises the steps of preparing a set corresponding to portions of the actual background scene and including non-actinic replicas of those parts of the background scene which will appear wholly or partly in front of the action and actinic replicas of those parts of the background scene constituting any part of the action, simultaneously exposing a pair of films to an action scene presented upon said set so that the action may be accurately related to portions of the background scene and so that portions of actors or objects in the action scene will be masked out by the said non-actinic replicas in the formation of the action images upon said films, developing one of said films without developing the other, and using the said developed film as a mask in exposing the said undeveloped film to an image of the background scene.

OTTO JOHN LAURO SEAMAN.